(12) United States Patent
Chiang et al.

(10) Patent No.: US 10,890,429 B2
(45) Date of Patent: Jan. 12, 2021

(54) AUTOMATIC CALIBRATION OPTICAL INTERFEROMETER AND AUTOMATIC CALIBRATION METHOD OF OPTICAL INTERFEROMETER

(71) Applicant: INDUSTRIAL TECHNOLOGY RESEARCH INSTITUTE, Hsinchu (TW)

(72) Inventors: Hung Chih Chiang, Chiayi (TW); Cheng Yi Chang, New Taipei (TW); Ting Wei Chang, New Taipei (TW); Chi Shen Chang, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/379,721

(22) Filed: Apr. 9, 2019

(65) Prior Publication Data

US 2020/0208958 A1 Jul. 2, 2020

(30) Foreign Application Priority Data

Dec. 27, 2018 (TW) .............................. 107147454 A

(51) Int. Cl.
*G01B 9/02* (2006.01)
(52) U.S. Cl.
CPC ....... *G01B 9/0209* (2013.01); *G01B 9/02067* (2013.01); *G01B 9/02071* (2013.01)
(58) Field of Classification Search
CPC .............. G01B 9/0209; G01B 9/02091; G01B 9/02067; G01B 9/02071; G01B 9/0205; G01B 9/02054; G01B 2290/60
See application file for complete search history.

(56) References Cited

U.S. PATENT DOCUMENTS 7,545,504 B2 6/2009 Buckland et al.
7,643,154 B2 1/2010 Kikawa et al.
(Continued)

FOREIGN PATENT DOCUMENTS

CN 101234015 B 3/2011
CN 105105717 A 12/2015
(Continued)

OTHER PUBLICATIONS

Baghaie, A., et al., "Involuntary Eye Motion Correction in Retinal Optical Coherence Tomography: Hardware or Software Solution?," Medical Image Analysis, vol. 37, pp. 129-145 (Apr. 2018).
(Continued)

*Primary Examiner* — Tarifur R Chowdhury
*Assistant Examiner* — Jonathon Cook
(74) *Attorney, Agent, or Firm* — Maschoff Brennan

(57) ABSTRACT

An automatic calibration optical interferometer comprises: a light source; an optical interference assembly, which divides a low coherent light into a first and a second incident light; an optical sampling assembly, with a first end receiving the first incident light and a partially reflective window at the second end being configured to divide the first incident light into a first reflected light and a first penetrating light configured to be emitted to the test sample; an optical reference assembly, with a reference mirror and an actuator, wherein the optical sampling assembly emits the second incident light to the reference mirror to generate a second reflected light, and the actuator moves the reference mirror; a polychromator, which outputs a displacement signal according to an optical path difference variation between the first and second reflected lights; and a displacement controller, which controls the actuator according to the displacement signal.

9 Claims, 6 Drawing Sheets

(56) References Cited

U.S. PATENT DOCUMENTS

| | | |
|---|---|---|
| 7,733,497 B2 | 6/2010 | Yun et al. |
| 9,326,679 B2 | 5/2016 | Takai |
| 9,603,518 B2 | 3/2017 | Wang et al. |
| 2002/0196450 A1* | 12/2002 | Olszak ............... G01B 11/2441 356/511 |
| 2010/0195112 A1 | 8/2010 | Davidson |
| 2016/0216501 A1* | 7/2016 | Cable ................... G02B 21/245 |
| 2018/0156600 A1 | 6/2018 | Cable et al. |

FOREIGN PATENT DOCUMENTS

| | | |
|---|---|---|
| CN | 103284691 B | 4/2017 |
| TW | I331211 B | 10/2010 |
| TW | I354092 B | 12/2011 |
| TW | I420072 B | 12/2013 |
| TW | I425184 B | 2/2014 |
| TW | I529368 B | 4/2016 |
| WO | 2018/117835 A1 | 6/2018 |

OTHER PUBLICATIONS

Szkulmowski, M., et al., "Spectrometer calibration for spectroscopic Fourier domain optical coherence tomography," Biomedical Optics Express, vol. 7, Issue 12, pp. 5042-5054 (Dec. 1, 2016).
Zawadzki, J.R., "Progress on Developing Adaptive Optics—Optical Coherence Tomography for In Vivo Retinal Imaging: Monitoring and Correction of Eye Motion Artifacts," IEEE J Sel Top Quantum Electron, vol. 20, Issue 2, pp. 33 (Dec. 24, 2014).
Taiwanese Office Action issued in corresponding application No. TW 107147454, dated Sep. 3, 2019.

\* cited by examiner

AUTOMATIC CALIBRATION OPTICAL INTERFEROMETER AND AUTOMATIC CALIBRATION METHOD OF OPTICAL INTERFEROMETER

CROSS-REFERENCE TO RELATED APPLICATIONS

This non-provisional application claims priority under 35 U.S.C. § 119(a) on Patent Application No(s). 107147454 filed in Taiwan, ROC on Dec. 27, 2018, the entire contents of which are hereby incorporated by reference.

BACKGROUND

1. Technical Field

This disclosure relates to optical interference, and more particularly to an automatic calibration optical interferometer and automatic calibration method of the optical interferometer.

2. Related Art

In the technical field of optical interference, since the transmission speed of light is extremely fast, it is very hard to measure the delay of wave front directly by the probe similar to the measurement of the ultrasonic. Therefore, the interference is generated by the fixed optical path difference between the sampling optical path and the reference optical path. The Michaelson interferometer has two optical arms, and the OPD (Optical Path Difference) between the two optical arms needs to be stable to generate interference. In general, an optical interferometer needs to be placed on a stable, shock-resistant surface, such as an optical shockproof table.

However, for a handheld interferometer, the measurement result may be inaccurate because the optical path difference may vary due to user's operation or external environmental.

SUMMARY

According to one or more embodiment of this disclosure, an automatic calibration optical interferometer, comprising: a light source configured to emit a low coherent light; an optical interference assembly coupled to the light source and configured to divide the low coherent light into a first incident light and a second incident light; an optical sampling assembly coupled to the optical interference assembly, wherein the optical sampling assembly comprises a first end and a second end, the first end couples to the optical interference assembly to receive the first incident light, the second end is configured to face a test sample, a partially reflective window at the second end is configured to divide the first incident light into a first reflected light and a first penetrating light, and the first penetrating light is configured to be emitted to the test sample; an optical reference assembly coupled to the optical interference assembly, wherein the optical reference assembly comprises a reference mirror and an actuator, the optical reference assembly receives the second incident light and emits the second incident light to the reference mirror so as to generate a second reflected light, and the actuator is configured to move the reference mirror; a polychromator coupled to the optical interference assembly, wherein the polychromator is configured to output a displacement signal according to an optical path difference variation between the first and second reflected lights; and a displacement controller electrically connecting to the polychromator and configured to control the actuator according to the displacement signal.

According to one or more embodiment of this disclosure, an automatic calibration method of optical interferometer comprising: emitting a low coherent light by a light source; dividing the low coherent light into a first incident light and a second incident light by an optical interference assembly; receiving the first incident light by a first end of an optical sampling assembly; dividing the first incident light into a first reflected light and a first penetrating light, wherein the first penetrating light emits to a test sample; receiving the second incident light by an optical reference assembly and emitting the second incident light to a reference mirror for generating a second reflected light; receiving the first reflected light and the second reflected light by a polychromator and outputting a displacement signal according to an optical path difference variation of said two reflected lights; and controlling an actuator of the optical reference assembly by a displacement controller according to the displacement signal for moving the reference mirror.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
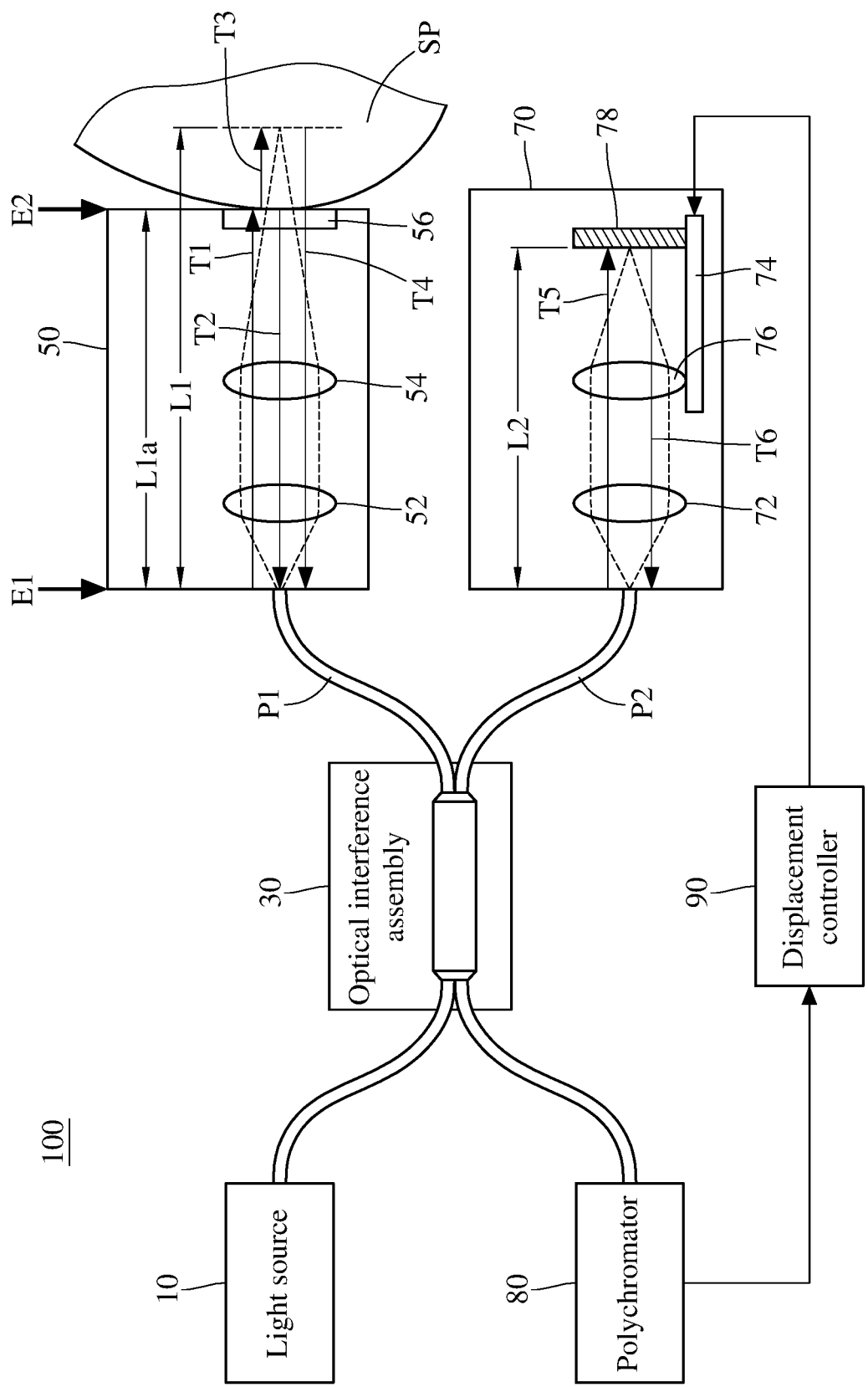
FIG. 1 is an architecture diagram of an automatic calibration optical interferometer and the test sample according to an embodiment of the present disclosure.

Please refer to FIG. 1, which is an architecture diagram of the automatic calibration optical interferometer 100 and the test sample SP according to an embodiment of the present disclosure. The automatic calibration optical interferometer 100 comprises a light source 10, an optical interference assembly 30, an optical sampling assembly 50, an optical reference assembly 70, a polychromator 80 and a displacement controller 90. The optical interference assembly 30 couples to the light source 10, the optical sampling assembly 50, the optical reference assembly 70, and the polychromator 80, as shown in FIG. 1.

As a whole, a light emitted by the light source 10 is divided by the optical interference assembly 30 into two parts transferred to the optical sampling assembly 50 and the optical reference assembly 70 respectively. These two assemblies 50, 70 respond with lights respectively, and the returned lights go back to the optical interference assembly 30 and are received by the polychromator 80 then.

As shown in FIG. 1, the light source 10 couples to the optical interference assembly 30. The light source 10 may emit low coherence lights of various wavelengths.

The optical interference assembly 30 may divide the low coherence light emitted by the light source 10 into a first incident light T1 and a second incident light T5. Along a first optical path P1, the first incident light T1 is transmitted to the optical sampling assembly 50. Along a second optical path P2, the second incident light T5 is transmitted to the optical reference assembly 70. The first optical path P1 and the second optical path P2 are, for example, implemented by fibers. However, the present disclosure is not thus limited thereto.

The optical sampling assembly 50 with a fixed optical length comprises a first end E1 and a second end E2. The first end E1 receives the first incident light T1 by coupling to the first optical path P1 of the optical interference assembly 30. The second end E2 is configured to face the test sample SP, which may be a biological tissue (such as the skin of an experimental subject). There are a first collimating lens 52 and a first telecentric lens 54 between the first end E1 and the second end E2, and these two lenses 52, 54 are configured to focus the first incident light T1 on a specific position of the test sample SP so as to measure an optical data of said position.

In the present disclosure, there is a partially reflective window 56 disposed at the second end E2. In the first optical path P1, the first incident light T1 goes through the first collimating lens 52 and the first telecentric lens 54 sequentially. The partially reflective window 56 may divide the first incident light T1 into a first reflected light T2, which returns along the original optical path, and a first penetrating light T3, which is further transmitted to the test sample SP. Specifically, on one hand, the first reflected light T2 goes through the first telecentric lens 54 and the first collimating lens 52 sequentially, and then returns to the first optical path P1. On the other hand, after the first penetrating light T3 reaches and enters the test sample SP, at least a part of the first penetrating light T3 is reflected by the test sample SP and defined as a sampling light T4. The sampling light T4 goes through the partially reflective window 56, the first telecentric lens 54, and the first collimating lens 52, and back to the first optical path P1. The optical path of the first reflected light T2 is labeled as L1$a$ in FIG. 1. The optical path of the sampling light T4 is labeled as L1 in FIG. 1. The optical interference assembly 30 receives the first reflected light T2 and the sampling light T4. The optical path L1$a$ of the first reflected light T2 is a key point of the measurement, and the optical path variation ΔL1 of the optical path L1$a$ is used to serve as a displacement compensation of the optical reference assembly 70.

In an embodiment, the second end E2 contacts to the surface of the test sample SP without any gap, and thus the first penetrating light T3 came from the partially reflective window 56 may be transmitted to the focused position under the surface of the test sample SP. However, the present disclosure does not limit thereto. For example, there is a gap between the second end E2 and the test sample SP when the focused position of the test sample SP can be fixed.

In an embodiment, in consideration of the reflection condition of the test sample SP responsive to the light, the energy of the first reflected light T2 is less than that of the first penetrating light T3. For example, the energy ratio of the first reflected light T2 to the first incident light T1 is from 0.1 to 5%, and the energy ratio of the first penetrating light T3 to the first incident light T1 is from 95.0% to 99.9%.

In an embodiment, the partially reflective window 56 is made of glass or polymer material.

In an embodiment, the partially reflective window 56 comprises an anti-reflective coating (AR coating), which is used to change the energy ratio of the partial reflection and the partial transmission of the partially reflective window 56. For example, the AR coating may decrease the reflectivity of the partially reflective window 56 so that the amplitude of the first reflected light T2 may decrease properly.

Figure 1A:
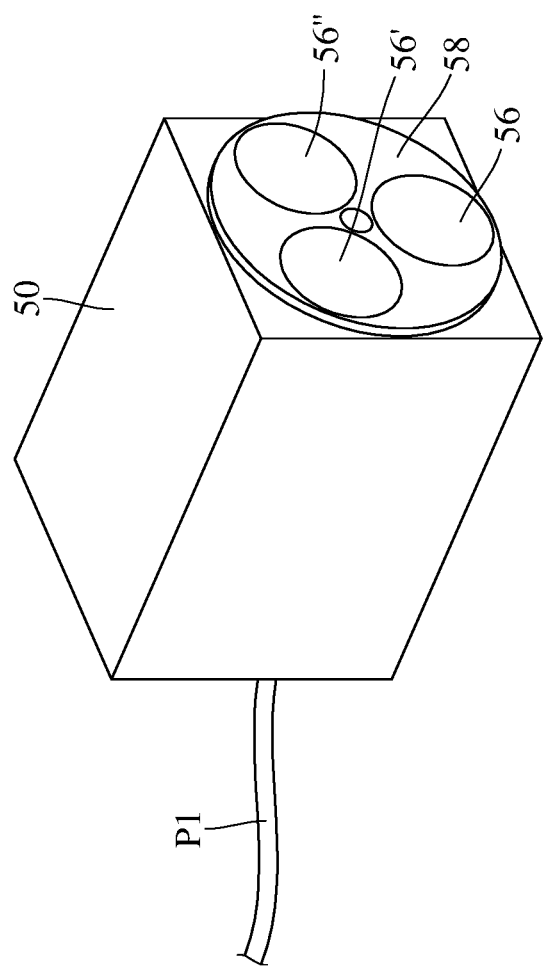
FIG. 1A is a schematic diagram of a switching device at the second end of the optical sampling assembly according to an embodiment of the present disclosure.

Please refer to FIG. 1A, which is a schematic diagram of a switching device 58 at the second end E2 of the optical sampling assembly 50 according to an embodiment of the present disclosure. In an embodiment, the optical sampling assembly 50 further comprises the switching device 58 at the second end E2. For example, said switching device 58 is a turntable as shown in FIG. 1A. The partially reflective window 56, another partially reflective window 56' and further another partially reflective window 56" are disposed on the switching device 58. These three partially reflective windows have different reflective coefficients. The switching device 58 is configured to select one of the partially reflective window 56, said another partially reflective window 56' and said further another partially reflective window 56" to receive the first incident light T1. Therefore, the automatic calibration optical interferometer 100 according to this embodiment of the present of the disclosure has the effectiveness of adjusting the intensity of the first penetrating light T3 according to the type of the test sample SP.

The optical reference assembly 70 with a variable optical path comprises the second collimating lens 72 and an actuator 74. The actuator 74 comprises a second telecentric lens 76 and a reference mirror 78. The optical reference assembly 70 receives the second incident light T5 through the second optical path P2 and emits the second incident light T5 to the reference mirror 78, so that the reference mirror 78 generates the second reflected light T6. The actuator 74 is configured to move the second telecentric lens 76 and the reference mirror 78 together at the same time, thereby adjusting the optical path L2 of the second incident light T5 emitting from the second optical path P2 to the reference mirror 78. As described above, the second incident light T5 goes through the second collimating lens 72, the second telecentric lens 76, and the reference mirror 78 (which reflects the second incident light T5). The above description is similar to the optical delay of the first incident light T1 in the optical sampling assembly 50.

The polychromator 80 outputs a displacement signal according to an optical path difference variation (hereinafter referred to as OPD variation) between the first reflected light T2 and second reflected lights T6.

The displacement controller 90 electrically connects to the polychromator 80. The displacement controller 90 controls the actuator 74 according to the displacement signal. The optical delay of the optical reference assembly 70 may be adjusted via moving the reference mirror 78 by the actuator 74.

In an embodiment of the present disclosure, because of the partially reflective window 56 and the operation of moving the reference mirror 78 by the actuator 74, the polychromator 80 may instantly receive the optical path difference variation (OPD variation) ΔL due to the probe. The displacement signal for the compensation is calculated on the basis of the OPD variation ΔL via signal processing and then the displacement signal is sent to the displacement controller 90. Therefore, the reference mirror 78 can be moved relatively to the second collimating lens 72 to compensate the aforementioned OPD variation ΔL to achieve the effectiveness of OPD stabilization.

The automatic calibration optical interferometer 100, according to an embodiment of the present disclosure, disposes the partially reflective window 56 in the optical sampling assembly 50. The optical sampling assembly 50 receives the first reflected light T2 reflected by the partially reflective window 56 and the sampling light T4 reflected by the test sample SP. The first reflected light T2 has the optical path L1a and the sampling light T4 has the optical path L1. Based on FIG. 1, the second end E2 locates at the right side of the partially reflective window 56; that is, the partially reflective coating layer is at the right side. On the other hand, the automatic calibration optical interferometer 100, according to an embodiment of the present disclosure, disposes the reference mirror 78 in the optical reference assembly 70, so the second incident light T5 is reflected by the reference mirror 78 and then the second reflected light T6 is generated in response. The second reflected light T6 has an optical path L2. The polychromator 80 may obtain the signal of L1a-L2 (by receiving signals of the first reflected light T2 and the second reflected light T6). When an OPD variation ΔL1 occurs to the handheld optical sampling assembly 50 for some reasons (such as deformation of the fiber served as the first optical path P1 due to external force, or length change of the fiber due to variation in environment temperature), the polychromator 80 can detect signals represented as (L1a+ΔL1)−L2. On the other hand, the optical path L2 in the optical reference assembly 70 may be modified as L2'=L2+ΔL1 based on the OPD variation ΔL1 via the variable optical path of the optical reference assembly 70. Therefore, the optical path relationship between the optical reference assembly 70 and the optical sampling assembly 50 is still L1a-L2.

The present disclosure utilizes the partially reflected window 56 so that the OPD variation due to environment or handheld operation may be compensated or modified to keep the optical interference phenomenon stable. Furthermore, the interferometer may have higher adaptability for portable use and higher tolerance with respect to the environment temperature.

Figure 2:
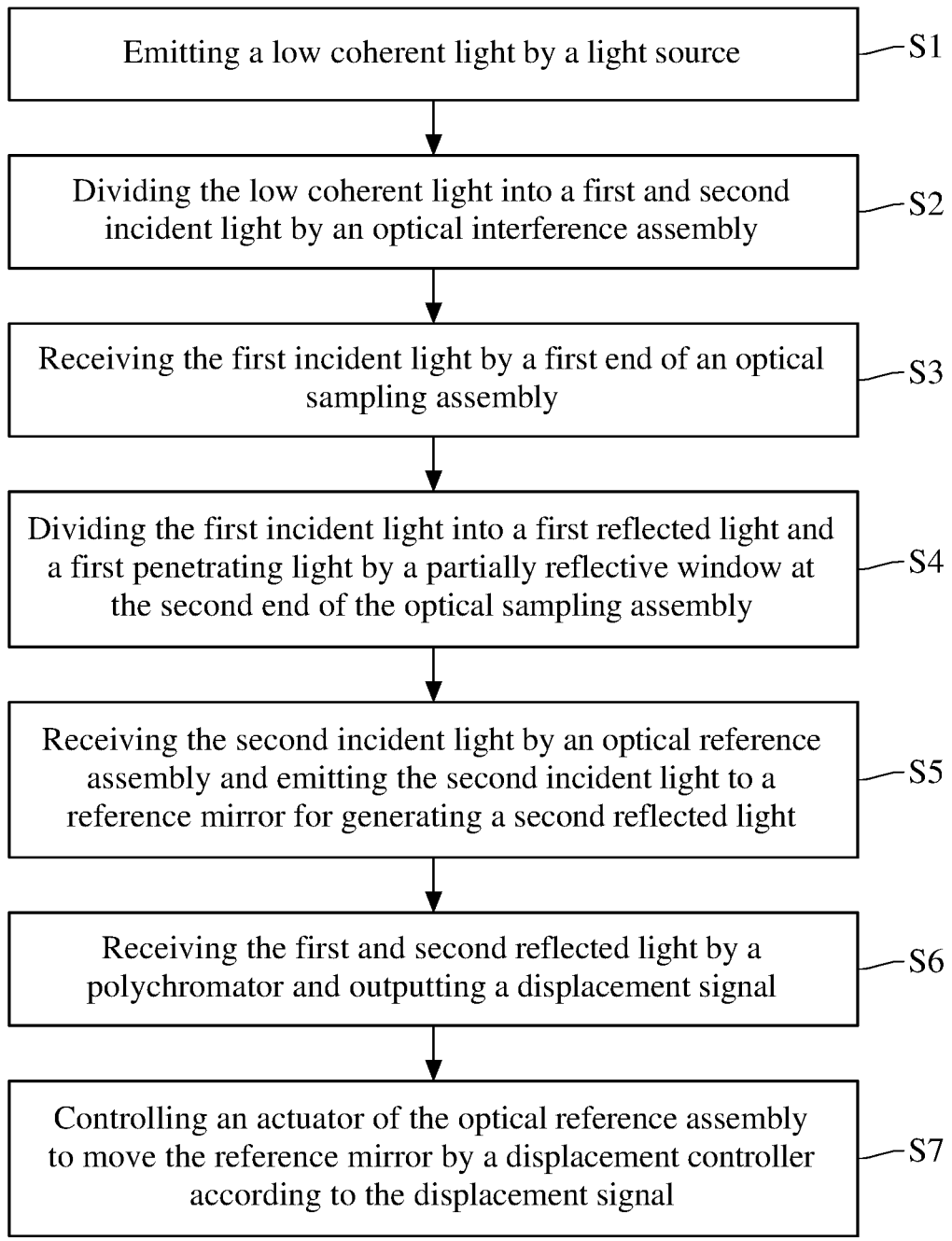
FIG. 2 is a flowchart of an automatic calibration method of the optical interferometer according to an embodiment of the present disclosure.

Please refer to FIG. 2, which is a flowchart of an automatic calibration method of the optical interferometer 100 according to an embodiment of the present disclosure.

Please refer to step S1, wherein the light source 10 generates and emits the low coherent light. Specifically, the aforementioned automatic calibration optical interferometer 100 uses the light source 10, which is capable of emitting light with multiple wavelengths, to emit the light.

Please refer to step S2, wherein the optical interference assembly 30 divides the low coherent light into the first incident light T1 and the second incident light T5. These two incident lights T1, T5 goes along the first optical P1 and second optical path P2 respectively.

Please refer to step S3, wherein the first end E1 of the optical sampling assembly 50 receives the first incident light T1. In other words, the first incident light T1 emits into the optical sampling assembly 50 from the first end E1.

In another embodiment, before the first end E1 of the optical sampling assembly 50 receives the first incident light T1, the automatic calibration method of the optical interferometer further comprises using a switching device 58 to select one of the partially reflective window 56, another partially reflective window 56' and further another partially reflective window 56" to receive the first incident light T1 according to the reflectivity of the test sample SP. Said another partially reflective window 56' and said further another partially reflective window 56" have reflective coefficients different from that of partially reflective window 56.

Please refer to step S4, wherein the partially reflective window 56 at the second end E2 of the optical sampling assembly 50 divides the first incident light T1 into the first reflected light T2 and the first penetrating light T3, wherein the first penetrating light T3 emits to the test sample SP.

In an embodiment, after the first penetrating light T3 emits to the test sample SP, the automatic calibration method of the optical interferometer further comprises receiving the reflected sampling light T4 by the polychromator 80, wherein the sampling light T4 goes through the partially reflective window 56 and the sampling light T4 is transmitted to the polychromator 80 along the optical sampling assembly 50. The reflection ratio of the test sample SP responsive to the first penetrating light T3 may be obtained by calculating the intensity of the sampling light T4, and thus a more suitable partially reflective window may be selected by the switching device 58.

Please refer to step S5, wherein the optical reference assembly 70 receives the second incident light T5 and emit it to the reference mirror 58, so the second reflected light T6 is generated responsively. From another perspective of view, after the second incident light T5 enters into the optical reference assembly 70, the second incident light T5 passes the second collimating lens 72 and the second telecentric lens 76 and focuses on the reference mirror 78, and then the second reflected light T6 returns back to the second optical path P2 along the original route.

Please refer to step S6, wherein the polychromator 80 receives the first reflected light T2 and the second reflected light T6 and outputs the displacement signals accordingly. Specifically, the polychromator 80 outputs the displacement signal according to the OPD variation ΔL between two reflected lights T2, T6. When the optical path L1 increases the OPD variation ΔL for some reasons, this OPD variation ΔL may be compensated by the displacement signal. The displacement signal is generated according to the OPD variation ΔL with a form of electronic signal or command. The detail of step S6 is described as follows.

Figure 2A:
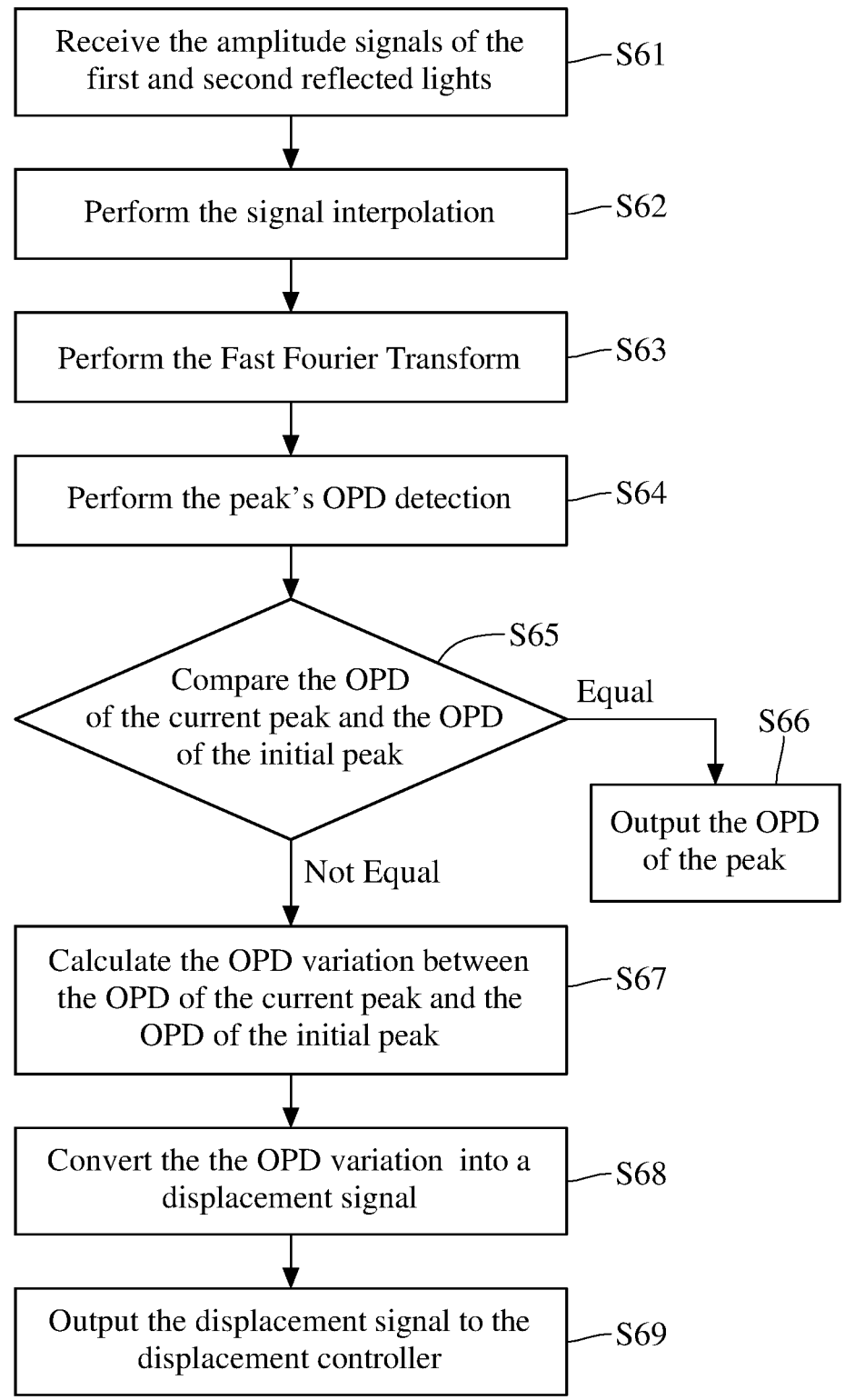
FIG. 2A is a flowchart of step S6 in the flowchart of the automatic calibration method of the optical interferometer according to an embodiment of the present disclosure.

Please refer to FIG. 2 and FIG. 2A together. FIG. 2A is a detail flowchart of step S6 in the flowchart (FIG. 2) of the automatic calibration method of the optical interferometer according to an embodiment of the present disclosure.

Figure 3A:
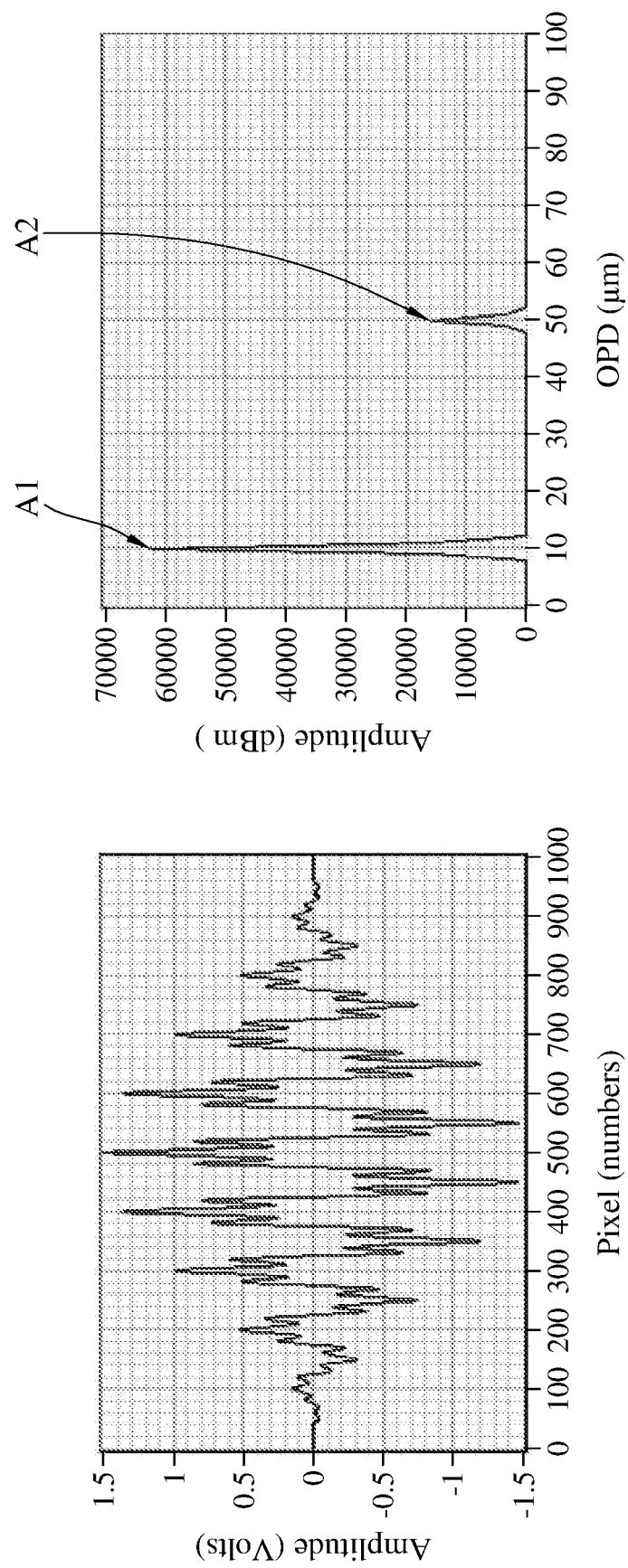
FIG. 3A is a simulation waveform diagram related to the test sample and generated by the polychromator.
Figure 3B:
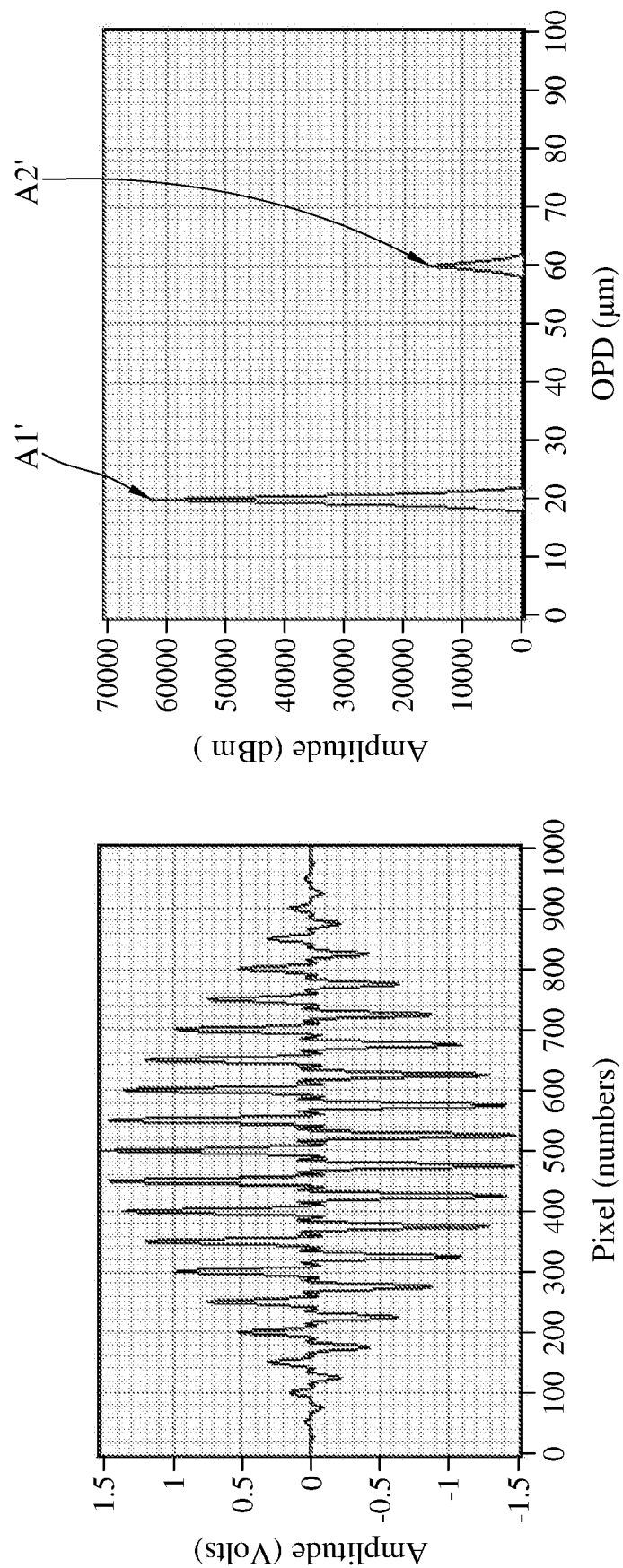
FIG. 3B is a simulation waveform diagram related to the test sample with OPD variation and generated by the polychromator.

Please refer to step S61, "receiving the amplitude signals of the first and second reflected lights T2, T6". That is, after the polychromator 80 receives the first reflected light T2 and the second reflected light T6 as described in step S6, amplitude values of these two reflected lights T2, T6 are further obtained. Please also refer to step S62, S63, and S64. These steps comprise: "performing a signal interpolation", "performing the Fast Fourier Transform", and "performing the peak's OPD detection", respectively. The above steps can convert two amplitude values obtained in step S61 into two OPD peak signals. Please refer to step S65, "comparing whether the difference between the OPD of the current peak and the OPD of the initial peak is within a range". If the difference is within a range, it means that the OPD of the current peak is as same as the OPD of the initial peak. And the next step is S66, "outputting the OPD of the current peak (or the OPD of the initial peak)". In contrast, if the difference between OPD of the current peak and the OPD of the initial peak is out of said range, it means that the OPD of the current peak is not equal to the OPD of the initial peak. And the next step is S67, "calculating the OPD variation ΔL between the OPD of the current peak and the OPD of the initial peak". The horizontal shift between two peaks is equivalent to the OPD variation ΔL. After the calculation for OPD variation ΔL, please refer to step S68 and step S69, wherein these two steps convert the OPD variation ΔL into a displacement signal and then this displacement signal is outputted to the displacement controller 90. Specifically, the peak signal A1 shown in FIG. 3A represents the OPD between L1a and L2 (A1=L1a−L2, which is obtained by receiving signals of first and second reflected lights T2, T6). When the OPD L1 increases by an OPD variation ΔL for some reasons, the peak signal A1' shown in FIG. 3B represents the OPD between L1a and L2 increases by the OPD variation ΔL (A1'=L1a'−L2=(L1a+ΔL)−L2). The horizontal shift between the peak signal A1 and the peak signal A1' represent the OPD variation ΔL. The horizontal shift signal is then converted into a displacement signal and this displacement signal is outputted to the displacement controller 90.

Please refer to FIG. 2, FIG. 3A and FIG. 3B together. FIG. 3A is a simulation waveform diagram related to the test sample SP and generated by the polychromator 80, and FIG. 3B is a simulation waveform diagram related to the test sample SP with OPD variation ΔL and generated by the polychromator 80.

Please refer to FIG. 3A. The detected signals of the first reflected light T2 and the second reflected light T6 on the polychromator 80 are shown in FIG. 3A. The peak signal A1 shows the OPD between L1a and L2 where the peak signal A1 locates at the position of 10 micrometers (A1=L1a−L2). The peak signal A1 derives from signals of the first and second reflected light T2, T6, which are received and used for the calculation of OPD variation ΔL later. The peak signal A2 shows the OPD between L1 and L2 where the peak signal A2 locates at the position of 50 micrometers (A2=L1−L2). The peak signal A2 derives from signals of the sampling light T4 and the second reflected light T6, which shows the information of the test sample SP.

When the optical interference assembly 30 causes the OPD variation ΔL for any reason, optical paths L1a, L1 of the optical sampling assembly 50 both increases by the OPD variation ΔL, which is resulted from changes in the internal optical path of the optical sampling assembly 50 instead of the test sample SP nor the gap). The detected signals on the polychromator 80 are shown in FIG. 3B. The horizontal shift of peak signal A1' in FIG. 3B and peak signal A1 in FIG. 3A represents the OPD variation ΔL. The peak signal A1' shows that the OPD between L1a' and L2 (A1'=L1a'−L2=(L1a+ΔL)−L2), and location of the peak signal A1' changes to 20 micrometers. The peak signal A2' shows the OPD between L1' and L2 (A2'=L1'−L2=(L1+ΔL)−L2), and location of the peak signal A2' also changes to the 60 micrometers. The OPD variation between L1 and L1' is ΔL (L1'=L1+ΔL). The OPD variation between L1a and L1a' is also ΔL (L1a'=L1a+ΔL).

Please refer to step S7, wherein the displacement controller 90 controls the actuator 74 of the optical reference assembly 70 to move the reference mirror 78 according to the displacement signal. Specifically, through the optical paths L2 and L1a with the fixed optical path, the modification L2'=L2+ΔL may be used to compensate the OPD variation ΔL. After receiving the displacement signal outputted by the polychromator 80 at step S6, the displacement controller 90 controls the actuator 74 of the optical reference assembly 70 to move the reference mirror 78 for modifying the optical path to L2'=L2+ΔL. As such, the relationship between the optical paths of the optical reference assembly 70 and the optical sampling assembly 50 remains as L1a-L2, eliminating the OPD variation ΔL after the displacement compensation thereof. Therefore, the state of measured signals in FIG. 3B may return to that in FIG. 3A so as to keep the interference signals and optical interference phenomenon stable.

In view of the above description, because of the partially reflected window of the present disclosure, the optical path difference variation caused by the change of the environment temperature or by the handheld operation may be compensated accordingly and the stability of optical interference phenomenon is improved. The present disclosure further improves the environmental tolerance of the interferometer and reduces the influence of handheld operations. In addition, with the implementation of the switching device, the present disclosure can adaptively select a partially reflective window with specified transmissivity according to the reflected ratio of the test sample to the light.

What is claimed is:

1. An automatic calibration optical interferometer, comprising:
   a light source configured to emit a low coherent light;
   an optical interference assembly coupled to the light source and configured to divide the low coherent light into a first incident light and a second incident light, wherein the optical interference assembly is implemented by a coupler or a splitter;
   an optical sampling assembly coupled to the optical interference assembly, wherein the optical sampling assembly comprises a first end and a second end, the first end couples to the optical interference assembly to receive the first incident light, the second end is configured to face a test sample, a partially reflective window at the second end is configured to divide the first incident light into a first reflected light and a first penetrating light, and the first penetrating light is configured to be emitted to the test sample;
   an optical reference assembly coupled to the optical interference assembly, wherein the optical reference assembly comprises a reference mirror and an actuator, the optical reference assembly receives the second incident light and emits the second incident light to the reference mirror so as to generate a second reflected light, and the actuator is configured to move the reference mirror;
   a polychromator coupled to the optical interference assembly, wherein the polychromator is configured to output a displacement signal according to an optical path difference variation which is derived from the first optical path of the first reflected light and the second optical path of the second reflected light; and
   a displacement controller electrically connecting to the polychromator and configured to control the actuator according to the displacement signal, wherein the reference mirror is moved with the optical path difference variation by the actuator, and a modified optical path of the second reflected light equals to a sum of a second optical path of the second reflected light and the optical path difference variation.

2. The automatic calibration optical interferometer of claim 1, wherein the partially reflective window is made of glass or polymer material.

3. The automatic calibration optical interferometer of claim 1, wherein an energy of the first reflected light is less than an energy of the first penetrating light.

4. The automatic calibration optical interferometer of claim 1, wherein the partially reflective window comprises an anti-reflective coating.

5. The automatic calibration optical interferometer of claim 1, wherein the optical sampling assembly further comprises a switching device at the second end, the partially reflective window and another partially reflective window are disposed on the switching device, two reflected coefficients of said two partially reflective windows are different, and the switching device is configured to select one of said two partially reflective windows to receive the first incident light.

6. The automatic calibration optical interferometer of claim 1, wherein an energy ratio of the first reflected light to the first incident light is from 0.1 to 5%, and an energy ratio of the first penetrating light to the first incident light is from 95.0% to 99.9%.

7. An automatic calibration method of optical interferometer comprising:
  emitting a low coherent light by a light source;
  dividing the low coherent light into a first incident light and a second incident light by an optical interference assembly, wherein the optical interference assembly is implemented by a coupler or a splitter;
  receiving the first incident light by a first end of an optical sampling assembly;
  dividing the first incident light into a first reflected light and a first penetrating light by a partially reflective window disposed on a second end of the optical sampling assembly, wherein the first penetrating light emits to a test sample;
  receiving the second incident light by an optical reference assembly and emitting the second incident light to a reference mirror for generating a second reflected light;
  receiving the first reflected light and the second reflected light by a polychromator and outputting a displacement signal according to an optical path difference variation which is derived from the first optical path of the first reflected light and the second optical path of the second reflected light; and
  controlling an actuator of the optical reference assembly by a displacement controller according to the displacement signal for moving the reference mirror, wherein the reference mirror is moved with the optical path difference variation by the actuator, and a modified optical path of the second reflected light equals to a sum of a second optical path of the second reflected light and the optical path difference variation.

8. The automatic calibration method of optical interferometer of claim 7 further comprising:
  after the first penetrating light emits to the test sample, receiving a sampling light reflected from the test sample by the polychromator, wherein the sampling light emits through the partially reflective window to the polychromator along the optical sampling assembly.

9. The automatic calibration method of optical interferometer of claim 7 further comprising:
  before the first end of the optical sampling assembly receives the first incident light,
  selecting one of the partially reflective window and another partially reflective window to receive the first incident light according to a reflectivity of the test sample by a switching device, wherein two reflected coefficients of said two partially reflective windows are different.

* * * * *